United States Patent [19]
Taylor et al.

[11] 3,896,311
[45] July 22, 1975

[54] PYROELECTRIC MOTION AND TEMPERATURE SENSITIVE INFRARED DETECTOR WITH CONDUCTIVE FINGERS

[75] Inventors: Allen L. Taylor, Woodbury; Francis J. McFadden, Lake Elmo, both of Minn.

[73] Assignee: Minnesota Mining and Manufacturing Company, St. Paul, Minn.

[22] Filed: Jan. 2, 1974

[21] Appl. No.: 429,521

[52] U.S. Cl. ................ 250/342; 250/338; 250/349
[51] Int. Cl. ............................................. G01t 1/16
[58] Field of Search ..... 73/355 R; 338/18; 340/279, 340/227; 250/332, 338, 221, 237 R, 342, 349

[56] References Cited
UNITED STATES PATENTS

| | | | |
|---|---|---|---|
| 2,016,036 | 1935 | Fitzgerald | 250/237 R |
| 2,198,725 | 4/1940 | Smith | 250/221 |
| 2,931,913 | 4/1960 | Long | 250/237 R |
| 3,084,301 | 4/1963 | Mohan | 338/18 |
| 3,600,588 | 8/1971 | Sayce | 250/237 R |
| 3,711,718 | 1/1973 | Paul | 73/355 R |
| 3,769,096 | 10/1973 | Askin | 338/18 |
| 3,772,518 | 11/1973 | Murayama | 250/332 |
| 3,824,392 | 7/1974 | Tibbling | 250/221 |

Primary Examiner—Harold A. Dixon
Attorney, Agent, or Firm—Alexander, Sell, Steldt & DeLaHunt

[57] ABSTRACT

A passive motion and temperature sensitive infrared radiation detector includes a housing with a front wall having a plurality of laterally spaced apart apertures that are filled with a radiation transmissive material. The housing back wall is formed of a three layer construction with outer and inner conductive layers in surface-to-surface contact with and separated by a layer of poled, pyroelectric material. In a preferred embodiment, the outer conductive layer is electrically grounded and the inner conductive layer is etched to define two interdigitated, electrically unconnected sets of conductive fingers. The sets of conductive fingers are heated when exposed to infrared radiation and, in turn, heat portions of the pyroelectric layer. As a result, electrostatic charges are developed on the heated pyroelectric portions and appear as voltage potentials on the heated finger sets. Electronic circuitry is associated therewith for sensing the voltage potentials and for triggering an alarm when a certain pattern of voltage potentials are consecutively developed on both sets of fingers. In a modified embodiment, the housing back wall is arranged with an electrically grounded, conductive inner layer and an outer layer containing interdigitated finger sets.

9 Claims, 6 Drawing Figures

PATENTED JUL 22 1975　　　　　　　　　　　　　　　　　　　　3,896,311

3,896,311

PYROELECTRIC MOTION AND TEMPERATURE SENSITIVE INFRARED DETECTOR WITH CONDUCTIVE FINGERS

BACKGROUND OF THE INVENTION

1. Field of the Invention

The present invention relates in general to infrared radiation detectors and more specifically to such detectors that employ a pyroelectric material for sensing infrared radiation.

2. Description of the Prior Art

There have been various attempts to provide infrared radiation detectors utilizing pyroelectric materials as exemplified by a U.S. patent to Doyle, U.S. Pat. No. 3,675,017, and an article written by Beerman entitled Pyroelectric Infrared Radiation Detector, 18 Applied Physics Letters, 203 (1971). Infrared radiation detectors incorporating photoconductive materials have also been suggested. See Osborne, Infrared System Detects Intruders, Opto Electronic Devices and Circuits, 146 (1964). For an infrared radiation detector to be commercially acceptable, however, it must be substantially immune to false triggering and must maintain a satisfactory sensitivity although exposed to a number of background infrared radiation sources such as a lamp or wall heater. No prior infrared radiation detector has satisfactorily fulfilled both of these requirements.

SUMMARY OF THE INVENTION

The present invention provides a passive motion and temperature sensitive infrared detector with a front portion that includes a plurality of elongate radiation transmissive areas, a back portion formed of an electrically grounded conductive outer layer, a pyroelectric intermediate layer, and an inner conductive layer etched to form two electrically unconnected sets of interdigitated fingers. Electronic circuitry is connected to each set of fingers and is employed for sensing the voltage potentials of the finger sets and for sounding an alarm when a certain pattern of voltage potentials is sensed.

In a preferred embodiment the size of the pyroelectric fingers is correlated with the dimensions of the front portion transmissive areas so that an infrared radiation source moving within a sensing proximity of the detector will be on a line of sight with primarily only one set of the fingers at a time in any particular location. As the radiation source moves about, the finger sets are alternately exposed to radiation therefrom. As a result, portions of the pyroelectric layer in physical contact with the exposed fingers are heated and develop electrostatic charges that appear as a voltage potential on the exposed finger set. The electronic circuitry of the detector is connected with each of the pyroelectric finger sets to sense voltage potential differences therebetween.

At the input of the electronic circuitry, a differential amplifier responds to the voltage potential of each set of fingers and has an output equal to the difference between the magnitudes of the voltage potentials of the two finger sets. Although the operation of the detector is dependent upon the ability of the electronic circuitry to sense the voltage potentials of the conductive finger sets, the differential amplifier prevents actuation of the detector alarm when both finger sets have the same voltage potential. Accordingly, the use of two finger sets in cooperation with the differential amplifier serves to immunize the detector from sensing variations in the ambient temperature of the room in which the detector is located and from sensing infrared radiation from background diffused radiation sources that expose both finger sets concurrently.

When the detector senses a moving infrared radiation source the differential amplifier has an output of alternating positive and negative pulses that are converted into a D.C. pulse train and then counted by a pulse counter. To trigger the alarm of the detector a predetermined number of pulses must be counted by the counter within predetermined periods or the counter will reset in readiness to begin a new count. In this way the detector is prevented from triggering as the result of detecting infrared radiation from non-moving sources such as a lamp, heat or fire within the sensing proximity of the detector.

A modified embodiment of the present invention also has a three layer back portion but differs in construction from the back portion previously described in that the conductive layer of etched finger sets forms the outer layer of the back portion and the layer of electrically grounded conductive material forms an inner layer. Such construction provides the advantage of eliminating spurious, electrostatic pickup by the detector.

The foregoing and other advantages of the present invention will appear from the following description. In the description reference is made to the accompanying drawings, which form a part hereof, and in which there is shown by way of illustration, and not of limitation, a specific form in which the invention may be embodied. Such embodiment does not represent the full scope of the invention, but rather the invention may be employed in a variety of embodiments, and reference is made to the claims herein for interpreting the breadth of the invention.

DESCRIPTION OF THE PREFERRED EMBODIMENT

Figure 1:
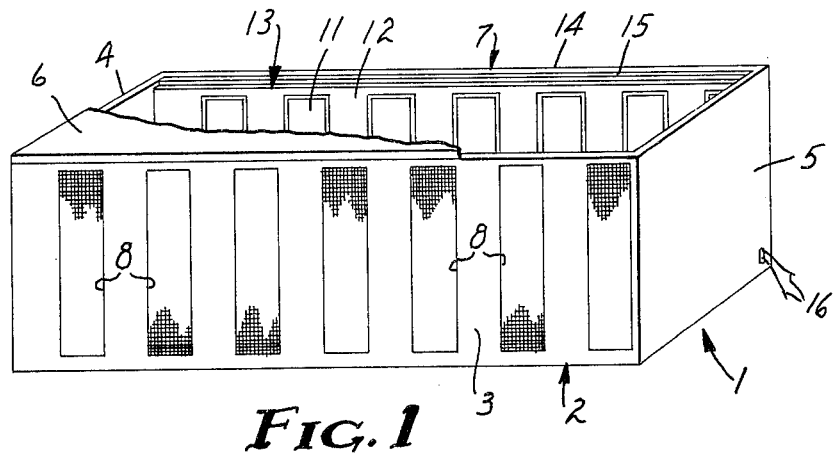
FIG. 1 is an enlarged perspective view of a preferred embodiment of the motion and temperature sensitive infrared detector of the present invention, with a portion of the top wall of the detector cut away to expose interior construction.

Referring now to the drawings and specifically to FIG. 1, a motion and temperature sensitive infrared radiation detector 1 that represents a preferred embodiment of the present invention is shown. The detector 1 is adapted to preferably sense the presence of a moving infrared radiation source such as an intruder in a home or office and, thus, may be used as an integral component of a burglar alarm system. The detector 1 is passive in that it includes no radiation transmitting components and its operation is entirely dependent upon the receipt of radiation from a source that it detects.

Included in the detector 1 are a rectangularly shaped housing 2 having a front wall 3, a pair of opposite sidewalls 4 and 5, a top wall 6, a bottom wall (not shown) and a back wall 7. The dimensions of the housing 2 are a matter of choice and primarily depend on the degree of sensitivity desired of the detector. The housing 2 may be built small enough and of such design that it can be used as an ornament placed in the room of one's home without alerting an intruder to its purpose. The amount of spacing between the front wall 3 and the back wall 7 is not critical and may be sufficiently small that a detector of the present invention could be built in the form of a picture. The use of the housing 2 is not essential to the operation of the present invention and instead the detector 1 may be formed with merely the front wall 3 and the back wall 7 together with spacing means therebetween.

The housing front wall 3 is formed of a material that may be either radiation absorbent or reflective. However, radiation is permitted to pass through the wall 3 without obstruction by means of a plurality of vertical, laterally spaced apart rectangular apertures 8 that are filled with a radiation transmissive material. The sidewalls 4 and 5, the top wall 6 and the bottom wall (not shown) are also radiation absorbent or reflective and connect between the front wall 3 and the back wall 7.

Figure 2:
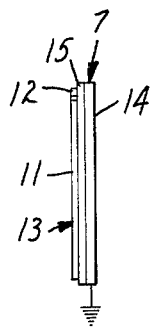
FIG. 2 is an end view of the back wall of the detector of FIG. 1, with the thickness of the layers forming the back wall enlarged.

Referring now to FIG. 2, the back wall 7 is formed of a three layer construction having an inner conductive layer 13, an outer conductive layer 14 that is electrically grounded, and an intermediate layer 15 of a poled pyroelectric material. All three layers of the back wall 7 are in surface-to-surface physical contact with one another. The layer 15 may be formed from such materials as a thin sheet of polyvinylidene fluoride or a ceramic plate of lanthanum-modified lead zirconate-titanate.

Although a few pyroelectric materials have dipoles that are naturally aligned in a poled relationship, normally the dipoles of pyroelectric materials are essentially arranged in random fashion. These dipoles can be rearranged in orientation when a pyroelectric material is heated above a particular temperature known as the poling temperature. At the poling temperature, the dipoles of a pyroelectric material will orient themselves in accordance with an applied electric field. The degree of dipole orientation is a function of the temperature to which the pyroelectric material is heated, the applied field strength and length of time the field is applied. For example, substantial poling begins in polyvinylidene fluoride when it is heated to a temperature greater than 90° C and an electric field of at least 4,000 volts per millimeter of thickness is applied for approximately 15 minutes. Increasing the temperature and/or the applied electric field will progressively increase the degree of poling achieved up to a maximum of saturation.

Once a pyroelectric material is poled and then cooled below its poling temperature, the applied field may be removed and the dipoles will remain as oriented by the applied field. The pyroelectric material will thereafter produce opposite electrostatic charges on its planar surfaces when heated or cooled beyond an ambient temperature. Care should be taken though to insure that the material is not heated above its poling temperature for extended periods in order that the dipoles are not permitted to return to a random orientation.

Figure 3:
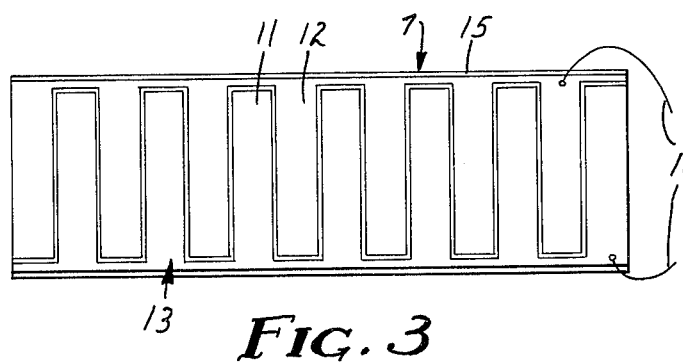
FIG. 3 is a front view of the back wall of FIG. 2.
Figure 4:
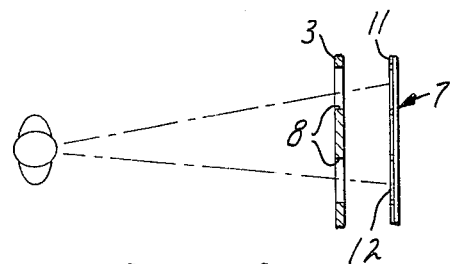
FIG. 4 is a diagrammatic plan view indicating how a fragmentary portion of the front wall of the detector of FIG. 1 selectively permits rays from a radiation source to pass therethrough to expose the back wall of the detector of FIG. 1.

The inner layer of the back wall 7 is etched to preferably define two electrically unconnected sets of interdigitated fingers 11 and 12 that are parallel to the front wall apertures 8, and are substantially equal in surface area to one another as best illustrated in FIG. 3. The dimensions of the finger sets 11 and 12 are not critical, and can be varied depending upon the dimensions of the housing 2. It is preferable, however, that the width of the individual fingers of the finger sets 11 and 12 and the apertures 8 each have approximately a 1 to 4 relationship with the distance between the front wall 3 and the back wall 7. Such relationship between the width of the interdigitated fingers of the sets 11 and 12, the apertures 8, and the distance between the front wall 3 and the back wall 7 is essential to the proper operation of the present invention so that an infrared radiation source moving about in front of the detector 1 will be on a line of sight primarily with only one set of the fingers 11 or 12 at any particular location as indicated by FIG. 4. During movement of the source to a new location, it will alternatively expose the fingers 11 and 12 to radiation, one set at a time.

When either of the finger sets 11 or 12 is heated by exposure to radiation the portions of the pyroelectric layer 15 in contact with the particular finger set exposed are also heated. As a result, electrostatic charges of opposite polarities are developed on the opposed surfaces of the heated portions of the layer 15. The layer 15 is nonconductive, which means that the electrostatic charges developed thereon are limited to the heated portions of the layer 15 and appear on the exposed, contacting finger set 11 or 12. For optimum sensing operation of the detector 1, the etched division between the finger sets 11 and 12 should be at least equal to the thickness of the layer 15 in order that heating of one of the sets 11 or 12 will produce heating throughout the entire cross section of the portions of the layer 15 contacting the heated finger set 11 or 12 without appreciably heating the portions of the layer 15 in contact with the unheated finger set.

As shown in FIG. 3, an electrical lead 16 is connected to each of the finger sets 11 and 12 to couple the fingers 11 and 12 with the electronic circuitry of the detector 1, which circuitry may be located at a remote position or in a compartment on one of the back or side walls of the detector 1. It is necessary, however, that the pyroelectric layer 15 be insulated from the electronic circuitry to prevent the heat produced thereby from affecting the ambient temperature or the layer 15.

Figure 5:
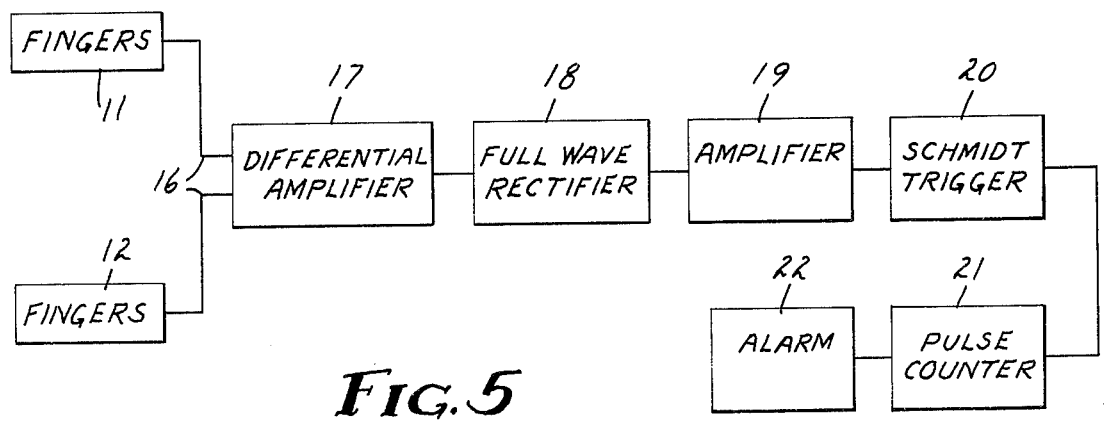
FIG. 5 is a block diagram of the electronic circuitry associated with the detector of FIG. 1.

Referring now to FIG. 5, the set of fingers 11 and 12 are shown forming a portion of a block diagram of the electronic circuitry employed with the detector 1. Such circuitry includes a differential amplifier 17, a full wave rectifier 18, a voltage amplifier 19, a Schmitt trigger 20, a pulse counter 21 and an alarm 22. This electronic circuitry converts a certain pattern of voltage potentials on the fingers 11 and 12 into a signal for triggering the alarm 22 in the following manner.

A voltage potential present on one or both of the sets of fingers 11 or 12 causes current flow therefrom through the respective leads 16 of the charged fingers to the differential amplifier 17. The current flow is equal to the pyroelectric coefficient of the material forming the layer 15 multiplied by the product of the charged surface area of the layer 15 and the rate of change in temperature of such surface area. In response to current flow from the charged finger sets 11 and/or 12, the differential amplifier 17 produces an output equal to the difference between the absolute magnitudes of the voltage potentials on the finger sets 11 and 12. This means that if both finger sets 11 and 12 are equally exposed to radiation, the voltage potentials that appear thereon will be equal in magnitude and the differential amplifier 17 will have a zero voltage output. Accordingly, only when the finger sets 11 or 12 experience different radiation exposures to provide a difference in voltage potentials is there an output from the differential amplifier 17.

Although it is highly preferable to temperature compensate the detector 1 by employing the two finger sets 11 and 12, the present invention is not restricted to the use of two finger sets. Instead, only one of the finger sets 11 or 12 may be employed to provide non-temperature compensated detection. A detector of this sort may be advantageously utilized in an environment that is maintained at a relatively stable temperature. In a detector 1 having only one set of the fingers 11 or 12, the electronic circuitry of the detector 1 may be simplified by the elimination of the differential amplifier 17 and the rectifier 18, which are needed only when both sets of fingers 11 and 12 are employed.

As previously mentioned with reference to FIG. 4, the purpose of the apertures 8 in the front wall 3 is to insure that a radiation source moving about within the sensing proximity of the detector 1 is on a line of sight with primarily only one set of fingers 11 or 12 at a time, and alternatively exposes the finger sets 11 and 12 during its movement. The potential difference between the sets of fingers 11 and 12 switches polarity in correlation with the alternating exposure and, thus, the output of the amplifier 17 has alternating positive and negative pulses. The full wave rectifier 18 receives the output of the amplifier 17 and transforms it into a pulsating positive D.C. signal which is applied to the voltage amplifier 19. The pulsating D.C. output of the rectifier 18 is increased substantially by the amplifier 19 and is then passed on to the Schmitt trigger 20. In a conventional manner the Schmitt trigger 20 produces a uniform pulse train in response to the pulsating D.C. from the amplifier 17, whereby each even numbered pulse of the train represents voltage appearing on one set of the fingers 11 or 12 and each odd numbered pulse represents the voltage developed on the other finger set 11 or 12.

The pulse train output of the Schmitt trigger 20 is fed to the input of a pulse counter 21 that may be set to respond to the receipt of at least a predetermined number of pulses within a certain period. Upon receiving the predetermined number of pulses, the counter 21 delivers an actuating pulse to the alarm 22, the sounding of which indicates that a moving infrared radiation source has been detected. Thus, the detector 1 may be preset so that a single pulse will not cause the alarm 22 to trigger. Preferably the counter 21 is adjusted so that it will trigger the alarm 22 when a count of three or more pulses is made, and the count must be made within certain periods of time because the counter 21 is timed in two respects. Firstly, each pulse of the count must be received within a predetermined first time period following the immediately preceding pulse to prevent the counter from resetting and beginning a new count. Secondly, if three pulses are not received by the counter 21 within a predetermined second time period, the counter 21 will reset in readiness for a new count. Such timed counts insure that the detector will be relatively insensitive to spurious radiation that could produce false triggering. Thus, the alarm of the detector 1 will not be actuated by a blinking light or some such other device that intermittently emits infrared radiation at a rate not meeting the timing requirements of the counter 21.

Figure 6:
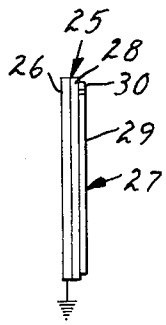
FIG. 6 is an end view of a modified embodiment of the back wall of the detector of FIG. 1, with the thickness of the layers forming the back wall enlarged.

The above described embodiment is immunized from detecting spurious radiation, but it is possible that false triggering of the detector 1 may result from an exposure to a concentrated plurality of electrostatic charges of the same polarity. An exposure of this sort may occur, for example, when someone approaches the detector because the human body has a net negative electrostatic charge. Upon exposure of one of the finger sets 11 or 12 to such a charge, electrons in the finger set exposed will be repelled from the source of the charge, producing a current flow, and it is possible that the current flow may be sufficient to produce a triggering of the detector 1. To protect the detector 1 from false triggering due to spurious electrostatic charges of one polarity, the arrangement of the back wall 7 may be modified. Referring now to FIG. 6, a back wall 25 for achieving this purpose is shown. The wall 25 has a three layer construction that includes an electrically grounded, conductive inner layer 26, an etched conductive outer layer 27 and an intermediate pyroelectric layer 28; all three layers being in surface-to-surface physical contact. The etched layer 27 has two sets of electrically unconnected, interdigitated sets of fingers 29 and 30 resembling the finger sets 11 and 12 of the back wall 7, and preferably the outer surface of the layer 27 may be coated with a radiation reflective material. Because the finger sets 29 and 30 form the outer layer 27 of the back wall 25, exposure of the detector 1 to spurious electrostatic sources will not induce current flow therein. Instead, the grounded layer 26 acts as a shield, isolating the remainder of the wall 25 from all electrostatic sources. Exposure of the inner layer 26 to electrostatic radiation will not produce a detection indication by the detector 1 because the current produced by such exposure will be conducted directly to ground.

What is claimed is:

1. An infrared motion and temperature sensitive detector for detecting a moving source of infrared radiation and comprising:
   a front portion having a plurality of laterally spaced apart radiation transmissive apertures;
   a back portion spaced from said front portion and formed of a multi-layer construction that includes:
   inner and outer conductive layers, at least one of which is formed to provide one or more electrically connected sets of fingers that are substantially parallel to the apertures of said front portion, one of said conductive layers is electrically grounded, and said inner conductive layer has areas that are simultaneously exposed to and heated by radiation that emanates from said moving source and passes through the apertures of said front portion and has other areas that are shielded from such radiation; and
   a layer of poled, pyroelectric material interposed between and in surface-to-surface contact with such conductive layers and having areas that are heated by the heated areas of said inner conductive layer to result in the development of electrostatic charges on said heated pyroelectric areas and on at least one of said sets of conductive fingers in contact with said heated pyroelectric areas; and electronic circuitry for sensing the potential on said one of said sets of fingers and for triggering an alarm only when a certain pattern of voltage potentials are developed on said one set within one predetermined time period.

2. A detector as recited in claim 1 wherein said finger formed conductive layer is the inner layer and said grounded conductive layer is the outer layer.

3. A detector as recited in claim 1 wherein said finger formed conductive layer is the outer layer and said grounded conductive layer is the inner layer.

4. A detector as recited in claim 1 wherein the alarm of said electronic circuitry is triggered upon the development of several consecutive voltage potentials on said one of said sets of fingers, each such potential occurring within another predetermined time period following the immediately preceding potential.

5. A detector as recited in claim 1 wherein said apertures are elongated and the spacing between the front and back portions is approximately four times as great as the width of the apertures and the individual fingers of said one of said sets.

6. A detector as recited in claim 1 wherein said finger formed conductive layer provides two electrically unconnected sets of interdigitated fingers.

7. A detector as recited in claim 6 wherein each of said sets of fingers is electrically connected to a differential amplifier to prevent actuation of the detector alarm when the voltage potentials of both sets of pyroelectric fingers are equal.

8. An infrared motion and temperature sensitive detector for detecting a moving source of infrared radiation and comprising:

a housing formed from a non-radiation transmissive material, which housing includes:

a front portion having a plurality of laterally spaced apart radiation transmissive apertures;

a back portion spaced from said front portion and formed of a multi-layer construction that includes:

inner and outer conductive layers, at least one of which is formed to provide one or more electrically connected sets of fingers that are substantially parallel to the apertures of said front portion, one of said conductive layers is electrically grounded, and said inner conductive layer has areas that are simultaneously exposed to and heated by radiation that emanates from said moving source and passes through the apertures of said front portion and has other areas that are shielded from such radiation; and a layer of poled, pyroelectric material interposed between and in surface-to-surface contact with said conductive layers and having areas that are heated by the heated areas of said inner conductive layer to result in the development of electrostatic charges on said heated pyroelectric areas and on at least one of said sets of conductive fingers in contact with said heated pyroelectric areas; and electronic circuitry for sensing the potential developed on said one of said sets of fingers and for triggering an alarm only when a certain pattern of voltage potentials are developed on said one set within a predetermined timer period.

9. A detector as recited in claim 4 wherein at least three of said voltage potentials occur within said one predetermined time period.

* * * * *